United States Patent
Grevers, Jr. et al.

(10) Patent No.: US 10,425,281 B2
(45) Date of Patent: Sep. 24, 2019

(54) AUTOMATED NETWORK ENTITY REPLACEMENT BASED ON HISTORICAL TOPOLOGY CONSCIOUSNESS

(71) Applicant: Cisco Technology, Inc., San Jose, CA (US)

(72) Inventors: Theodore Robert Grevers, Jr., Milford, MA (US); Raja Rajaram Kannan, Leander, TX (US); Rudolph B. Klecka, III, Austin, TX (US); Gregory Faison Morris, Nashua, NH (US)

(73) Assignee: Cisco Technology, Inc., San Jose, CA (US)

( * ) Notice: Subject to any disclaimer, the term of this patent is extended or adjusted under 35 U.S.C. 154(b) by 124 days.

(21) Appl. No.: 15/808,984

(22) Filed: Nov. 10, 2017

(65) Prior Publication Data

US 2019/0149416 A1    May 16, 2019

(51) Int. Cl.
*H04L 12/24* (2006.01)

(52) U.S. Cl.
CPC ...... *H04L 41/0856* (2013.01); *H04L 41/0873* (2013.01)

(58) Field of Classification Search
CPC ....... H04L 41/04; H04L 41/085; H04L 41/12; H04L 45/02; H04L 41/0856; H04L 41/0873; H04W 84/18
USPC ......................................................... 370/254
See application file for complete search history.

(56) References Cited

U.S. PATENT DOCUMENTS

| | | | |
|---|---|---|---|
| 6,282,175 B1 | 8/2001 | Steele et al. | |
| 7,924,747 B2 | 4/2011 | McNeill et al. | |
| 8,606,961 B2 * | 12/2013 | Farkas | H04L 45/00 709/238 |
| 2003/0009552 A1 | 1/2003 | Benfield et al. | |
| 2010/0180016 A1 * | 7/2010 | Bugwadia | G06F 9/4411 709/220 |
| 2010/0191848 A1 * | 7/2010 | Fujita | H04L 45/02 709/224 |

(Continued)

OTHER PUBLICATIONS

"Operations support system", https://en.wikipedia.org/wiki/Operations_support_system, 2 pages, Aug. 10, 2017, Wikimedia Foundation, Inc.

(Continued)

*Primary Examiner* — Robert J Lopata
(74) *Attorney, Agent, or Firm* — Behmke Innovation Group LLC; James Behmke; Stephen D. LeBarron

(57) ABSTRACT

In one embodiment, a device in a network maintains a topology database of one or more topologies of entities in the network. The device identifies a replacement entity that has physically replaced a particular one of the entities in the network. The device determines whether neighbor information regarding one or more of the entities that neighbor the replacement entity matches neighbor information in the topology database associated with the replaced entity. The device determines whether client information regarding one of more clients of the replacement entity matches client information in the topology database associated with the replaced entity. The device sends an alert when the neighbor or client information of the replacement entity does not match the neighbor or client information in the topology database associated with the replaced entity.

20 Claims, 10 Drawing Sheets

(56) References Cited

U.S. PATENT DOCUMENTS

| | | | |
|---|---|---|---|
| 2011/0022725 A1* | 1/2011 | Farkas | H04L 45/00 709/238 |
| 2013/0103739 A1 | 4/2013 | Salgueiro et al. | |
| 2014/0244810 A1* | 8/2014 | Chen | H04L 61/2076 709/221 |
| 2016/0036638 A1* | 2/2016 | Campbell | H04L 41/0846 709/222 |
| 2016/0112436 A1* | 4/2016 | Kopp | H04L 41/0809 726/1 |
| 2016/0182407 A1* | 6/2016 | McCaughan | H04L 49/557 370/219 |
| 2016/0191308 A1* | 6/2016 | Berry | H04L 41/0806 709/221 |
| 2016/0226927 A1* | 8/2016 | Takahashi | H04L 41/0813 |
| 2016/0352569 A1* | 12/2016 | Galliher, III | H04L 29/06 |
| 2017/0032011 A1* | 2/2017 | Song | G06F 16/25 |
| 2017/0155556 A1* | 6/2017 | Yuan | H04L 41/142 |
| 2017/0155557 A1 | 6/2017 | Desai et al. | |
| 2017/0272329 A1* | 9/2017 | Bennett | H04L 41/12 |
| 2018/0262454 A1* | 9/2018 | Zandi | H04L 51/14 |
| 2018/0316594 A1* | 11/2018 | Wu | H04L 45/02 |

OTHER PUBLICATIONS

"The Definition of OSS and BSS", http://www.ossline.com/2010/12/definition-oss-bss.html, Dec. 5, 2010, 2 pages, OSS Line.
Smart Install Configuration Guide—Smart Install Description [Cisco Cat]; https://www.cisco.com/c/en/us/td/docs/switches/lan/smart_install/configu . . . ; pp. 1-12.

* cited by examiner

AUTOMATED NETWORK ENTITY REPLACEMENT BASED ON HISTORICAL TOPOLOGY CONSCIOUSNESS

TECHNICAL FIELD

The present disclosure relates generally to computer networks, and, more particularly, to automated network entity replacement based on historical topology consciousness.

BACKGROUND

Network topologies may change at any moment. For example, a network topology may change due to a network expansion or reduction. In another example, a topology change may be triggered by a failure of a network entity, such as a switch, router, or autonomous access point. In the latter case, replacement of the entity by an administrator or operator can take some time to complete, thereby restoring full functionality back to the network. However, this replacement process can also be complicated by various conditions, such as the administrator or operator misconfiguring the replacement entity, the replacement entity being of a different type or configuration than the malfunctioning entity, and the like.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
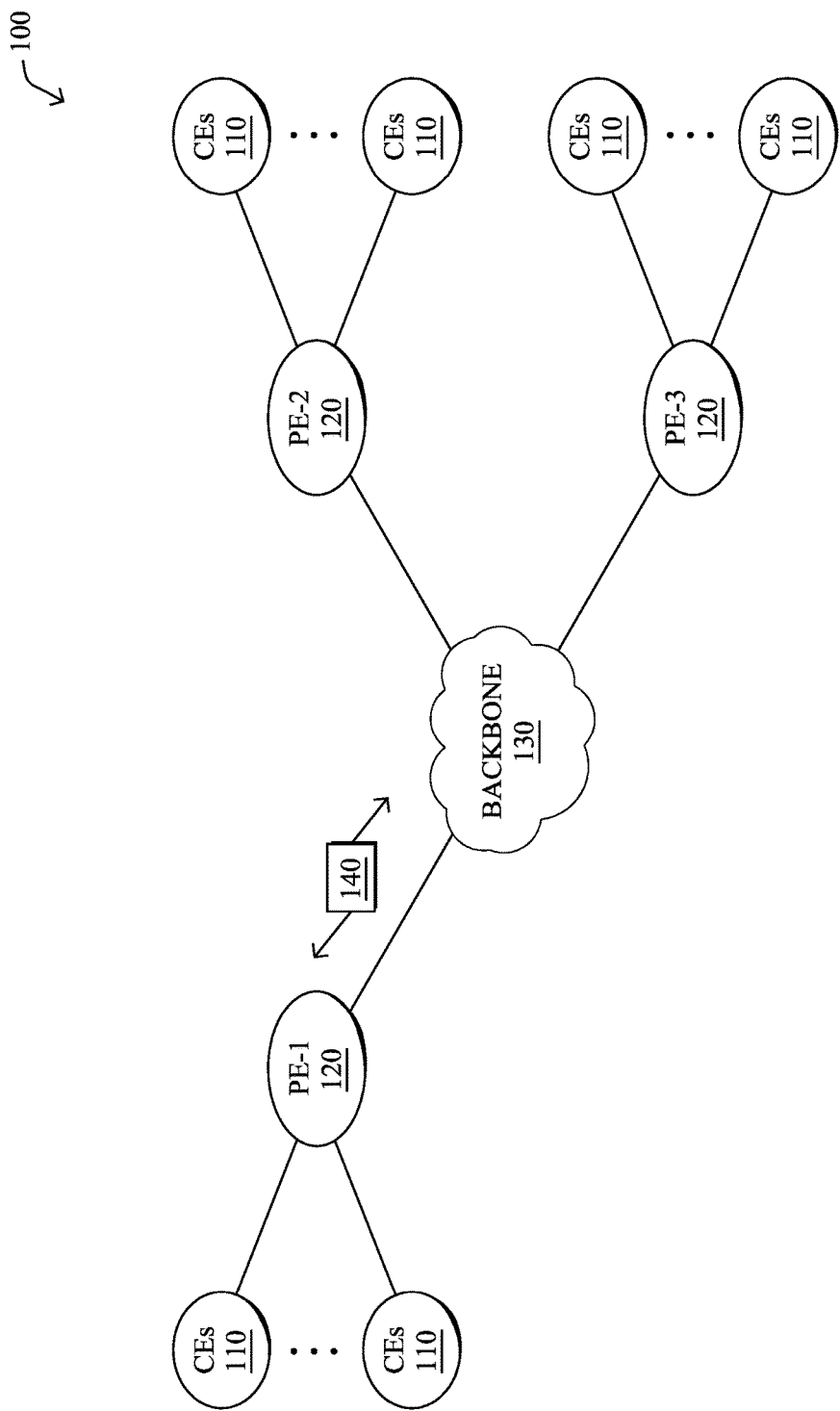
FIGS. 1A-1B illustrate an example communication network.

According to one or more embodiments of the disclosure, a device in a network maintains a topology database of one or more topologies of entities in the network. The device identifies a replacement entity that has physically replaced a particular one of the entities in the network. The device determines whether neighbor information regarding one or more of the entities that neighbor the replacement entity matches neighbor information in the topology database associated with the replaced entity. The device determines whether client information regarding one or more clients of the replacement entity matches client information in the topology database associated with the replaced entity. The device sends an alert when the neighbor or client information of the replacement entity does not match the neighbor or client information in the topology database associated with the replaced entity.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection. 2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
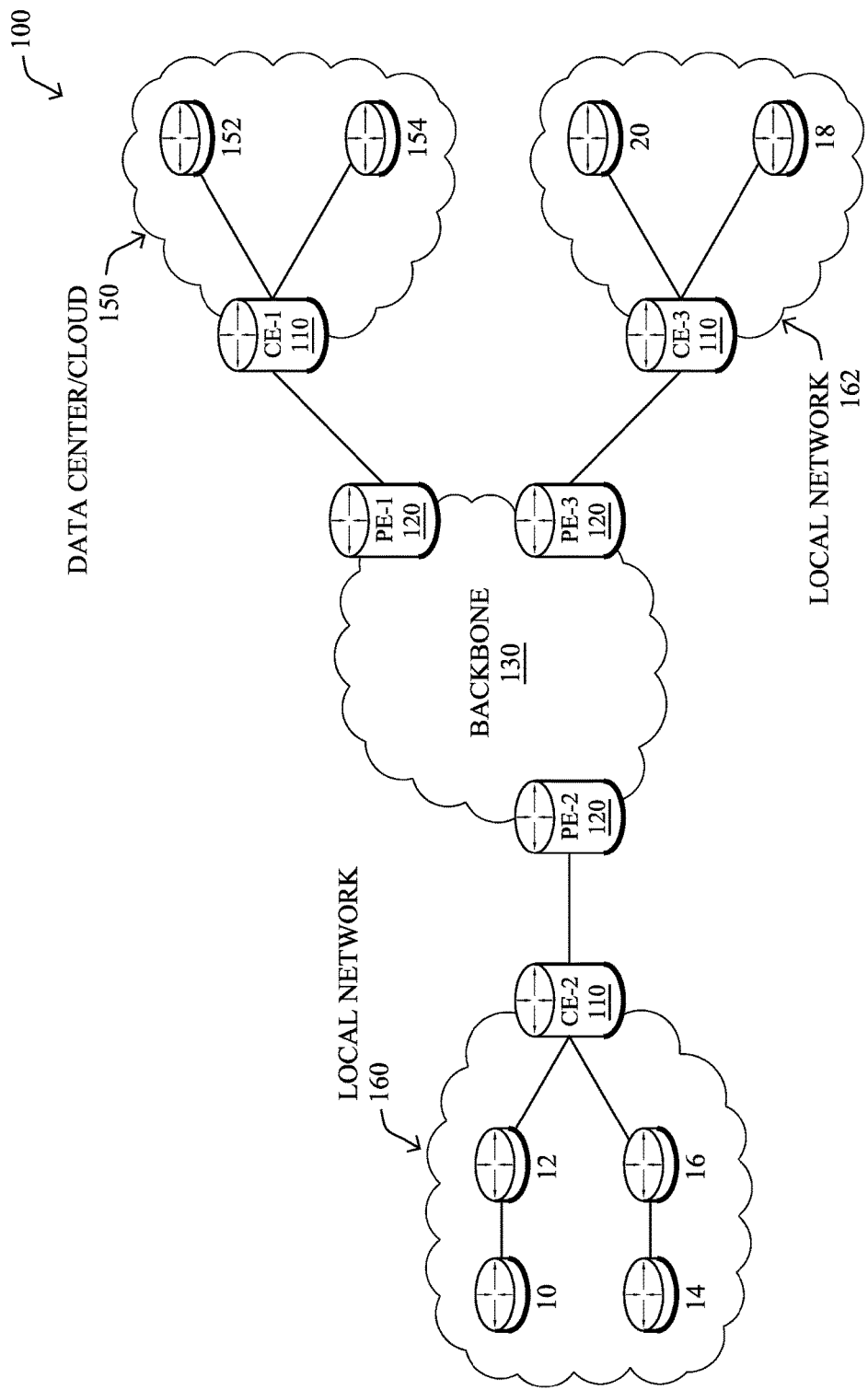

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
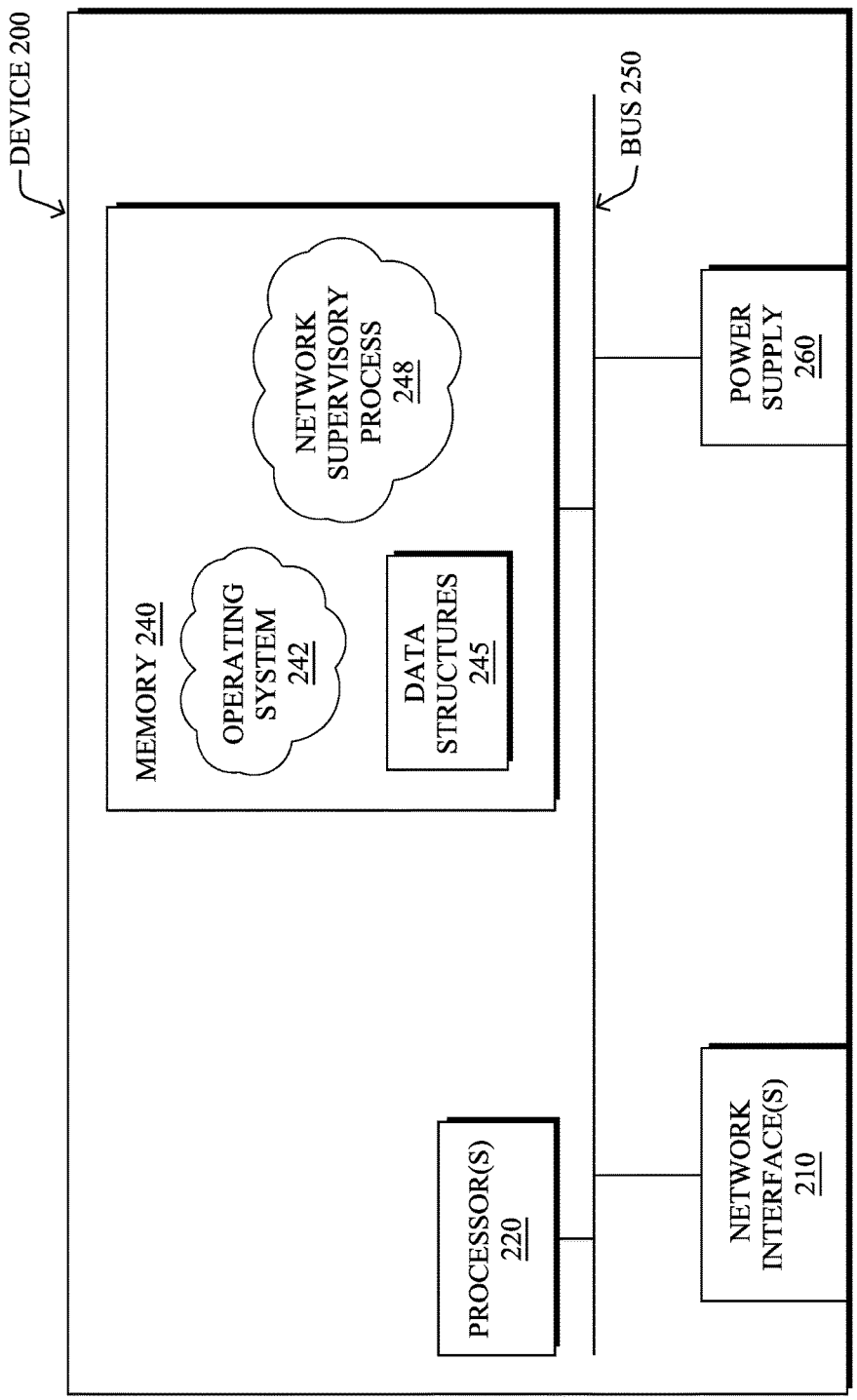
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a network supervisory process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

As noted above, regardless of the network environment being enterprise or service provider, the replacement of a failed network entity, such as a switch, gateway, or autonomous access point may require some level of human intervention to replace the failed device. It is during that time of human intervention that an administrator or operator may need to apply a network configuration to the device, often the same configuration as the previous device that is being replaced. However, any involvement of a human today will introduce some potential for error during the replacement process. Rather than simply automating the steps that a human administrator or operator would perform, shifting the bulk of the replacement process to the network itself allows for the performance of new validation tasks and the use of certain information that would not otherwise be collected or considered.

Automated Network Entity Replacement Based on Historical Topology Consciousness

The techniques herein introduce a two-tiered method of validation to ensure that the correct configuration is applied to a replacement network entity. In some aspects, the techniques may implement, maintain, and leverage historical topology consciousness in the network, thereby allowing information about the historical topologies of the network to be used during the replacement of a network entity. In the first tier of validation, the network may track the topology of the network using a discovery protocol such as the Link Layer Discovery Protocol (LLDP) and/or the Cisco Discovery Protocol (CDP). In the second tier of validation, the network may also track the edge client device(s) connected to the ports of the network entity, to confirm that the extended topology is accurate and has not been compromised prior to the delivery of the running configuration for the network entities.

Specifically, according to one or more embodiments of the disclosure as described in detail below, a device in a network maintains a topology database of one or more topologies of entities in the network. The device identifies a replacement entity that has physically replaced a particular one of the entities in the network. The device determines whether neighbor information regarding one or more of the entities that neighbor the replacement entity matches neighbor information in the topology database associated with the replaced entity. The device determines whether client information regarding one of more clients of the replacement entity matches client information in the topology database associated with the replaced entity. The device sends an alert when the neighbor or client information of the replacement entity does not match the neighbor or client information in the topology database associated with the replaced entity.

Illustratively, the techniques described herein may be performed by hardware, software, and/or firmware, such as in accordance with the network supervisory process 248, which may include computer executable instructions executed by the processor 220 (or independent processor of interfaces 210) to perform functions relating to the techniques described herein.

Figure 3:
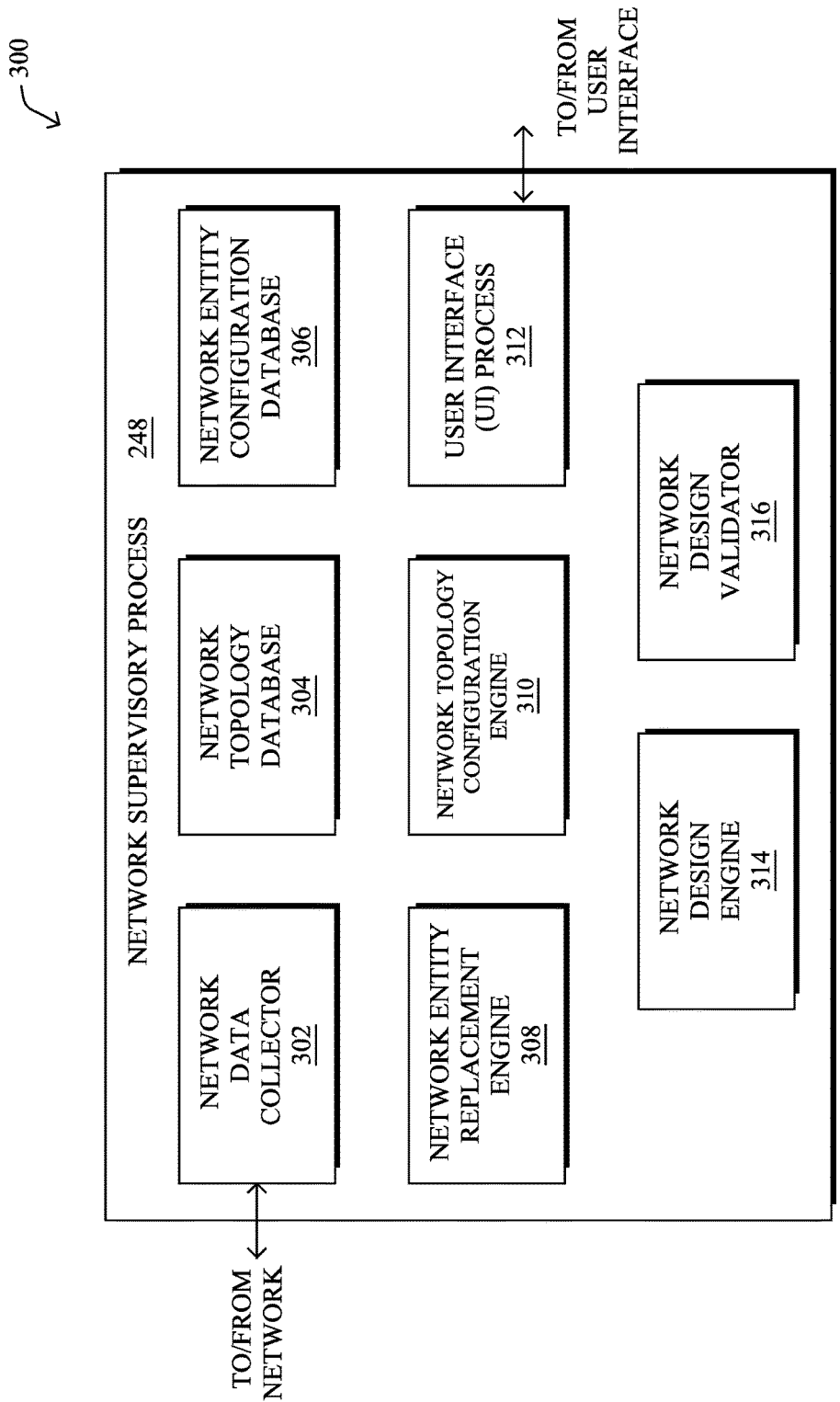
FIG. 3 illustrates an example architecture for automated network entity replacement.

Operationally, FIG. 3 illustrates an example architecture 300 for automated network entity replacement, according to various embodiments. As shown, network supervisory process 248 may comprise a number of components 302-316. In some implementations, these components may be implemented on a single device, such as an NMS or other supervisory device. In further implementations, components 302-316 may be implemented in a distributed manner across any number of devices in the network or as part of a fog or cloud computing-based service. In addition, the functionalities of the components of architecture 300 may be combined, omitted, or implemented as part of other processes, as desired.

In various embodiments, network supervisory process 248 may include a network data collector 302 configured to collect information from the network regarding the topology of the network and use the collected topology information to populate network topology database 304. In other words, network topology database 304 may maintain a history of the topology of the network over time, including a record of the neighbors of a network entity and any edge client devices connected to the entity. For example, a network entity may use CDP to identify its neighboring network entities in the topology and then use LLDP to identify the edge client devices connected to the entity. In turn, the network entity may report the information regarding its neighbor(s) and attached client(s) to network data collector 302 for storage in network topology database 304.

Thus, through the operation of network data collector 302, network topology database 304 may retain a record of the topology of the network at any given point in time. For example, network topology database 304 may store and relate any or all of the following information received by network data collector 302:

- An identifier for a particular network entity (e.g., a MAC address or other unique identifier for the entity).
- One or more identifiers for network entities that neighbor the particular network entity.
- Port information regarding the ports via which the particular network entity is connected to its neighboring entity or entities.
- One or more identifiers for clients that are attached to the particular network entity. For example, in the case of the particular network entity being an access-level switch, a client may be any edge device connected to the switch. Similarly, if the network entity is a wireless access point, a client may be any wireless endpoint device that uses the access point to communicate via the network.
- Timestamp information indicative of when the above information was captured, reported, and/or in effect in the network.

In some embodiments, network data collector 302 may also collect information about the configurations of the entities in the network and store this information in network entity configuration database 306. Example configuration information that can be tracked in network entity configuration database 306 may include, but not limited to, any or all of the following:

- The physical characteristics of a network entity. This can include the number of ports of a switch, the wireless capabilities of an access point (e.g., whether the access point supports 802.11n, 802.11ac, etc.), the maximum number of connections, computing resources, or the like.
- The firmware version of the network entity.
- Other installed applications or services on the network entity.
- Timestamp information indicative of when the above information was captured, reported, and/or in effect in the network.

By tracking the configurations of the network entities, network entity configuration database 306 can be queried to determine the configuration of a specific network entity at any given point in time.

According to various embodiments, network supervisory process 248 may also include a network entity replacement engine 308. Generally speaking, network entity replacement engine 308 may be operable to automatically ensure that any replacement network entity installed in the network is properly configured to take the place of the replaced network entity. In one embodiment, when the replacement entity is installed in the network, the replacement entity may identify its neighbors, clients, and/or configuration and include this information in a request sent to network data collector 302 for validation by network entity replacement engine 308.

Based on the information provided to network supervisory process 248 by the replacement network entity, network entity replacement engine 308 may validate the installation by comparing the provided information to the historical topology information in network topology database 304 and/or to the entity configuration information in network entity configuration database 306. For example, consider the case of a network switch being replaced in the network. In such a case, network entity replacement engine 308 may compare the port assignment between the replacement entity and a neighbor to the port assignment of the previous entity that it replaced.

As a second level of validation, network entity replacement engine 308 may also compare LLDP data from the replacement entity regarding the edge client devices of the replacement entity, to ensure that the set of edge client devices matches that of the replaced entity. Performing this second level of validation prevents the potential for spoofing of network entities in the network infrastructure, and establishes a higher level of integrity governed by network supervisory process 248.

In addition to confirming that the neighboring network entities and edge clients of the replacement entity match that of the replaced entity, network entity replacement engine 308 may further leverage network entity configuration database 306 to automatically configure the replacement entity. For example, assume that the replacement entity and the entity that it replaces are of the same make and model, but that the replacement entity is running a different version of firmware than the replaced entity. In such a case, network entity replacement engine 308 may update the firmware of the replacement entity to match that of the entity that it replaced (e.g., by upgrading or downgrading the firmware version). In doing so, network entity replacement engine 308 may also apply any required certificates and/or licenses to the replacement entity, for a seamless replacement that meets the standards of the prior device.

In further embodiments, network entity replacement engine 308 may also be configured to validate the installation and configuration of a replacement network entity vis-à-vis any number of previously installed network entities. For example, assume that the replacement entity is a 12-port switch and replaces a 24-port switch. In such a case, network entity replacement engine 308 may not be able to ensure that the topology information and configuration of the replacement switch match that of the 24-port switch, due to their physical differences. However, now assume that the 24-port switch itself had previously replaced another 12-port switch, at some point in time. In such a case, network entity replacement engine 308 may identify this other 12-port switch and use its topology information and configuration to complete the installation and configuration of the new 12-port switch.

Network supervisory process 248 may also include a user interface (UI) process 312 that can communicate with one or more user interfaces (e.g., a display, an input device, etc.). For example, UI process 312 may receive instructions from a UI that control the operation of network entity replacement engine 308 and/or allow network entity replacement engine 308 to send alerts when a replacement entity cannot be validated.

Figure 4A:
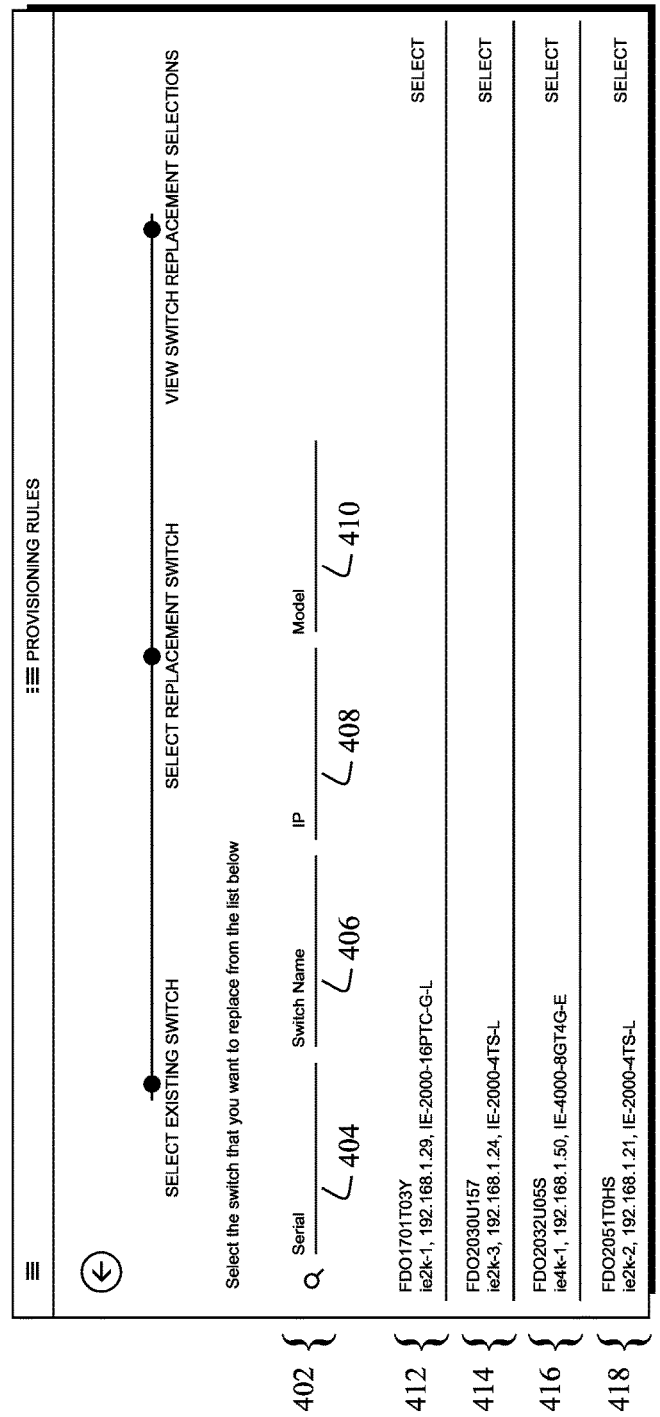
FIGS. 4A-4B illustrate an example user interface for automated network entity replacement.
Figure 4B:
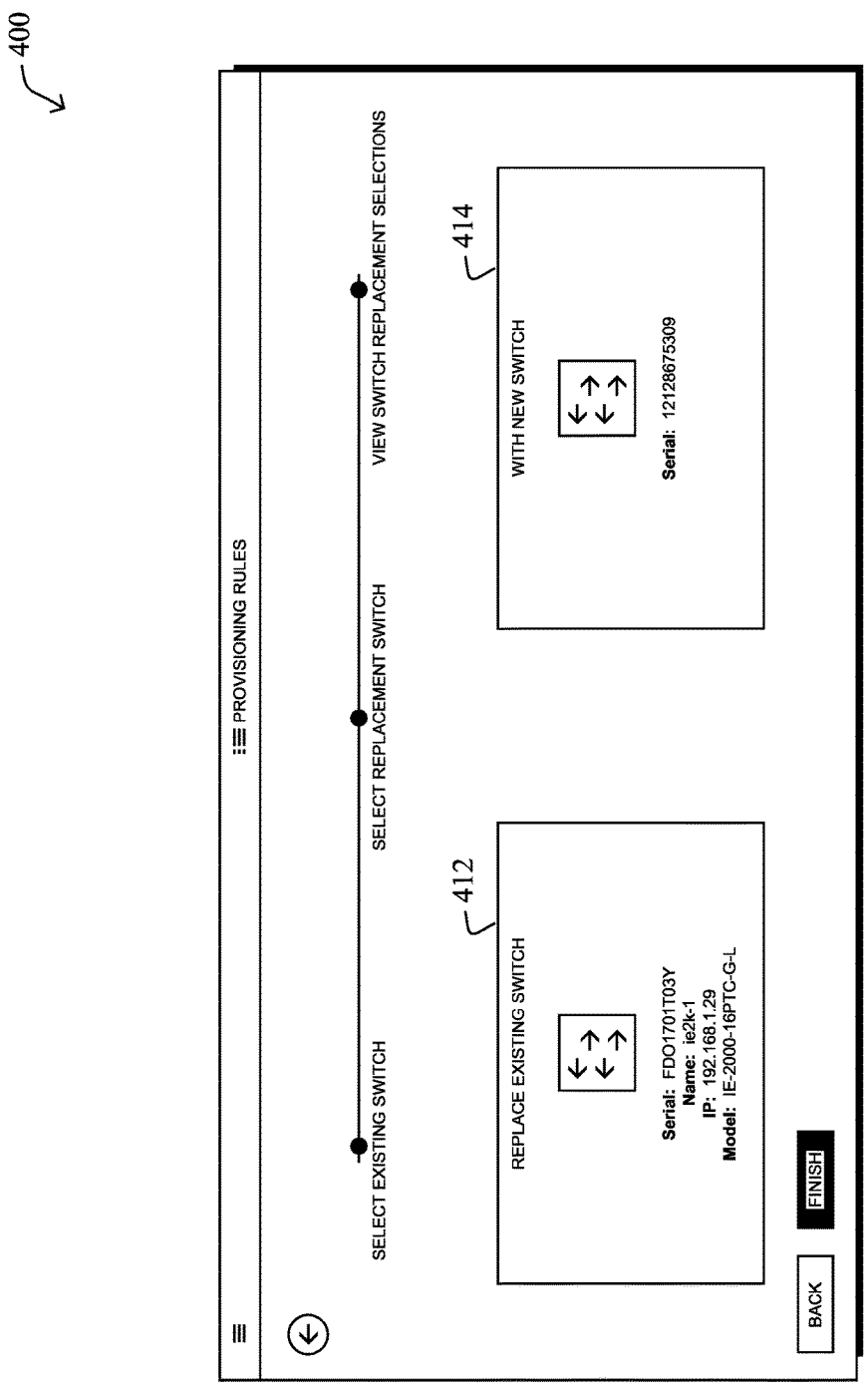

FIGS. 4A-4B illustrate an example UI 400 for automated network entity replacement that UI process 312 may present to an electronic display. As shown in FIG. 4A, UI 400 may include a number of input fields configured to allow the user to control the validation and reconfiguration of a replacement entity in the network. Notably, UI 400 may include a number of search fields 402, that allow the user to search for a particular switch in the network by serial number (field 404), name (field 406), IP address (field 408), and/or model (field 410). In response to such a search request, UI 400 may display a set of matching switches 412-418, thereby allowing the user to select the particular switch that is being replaced. In a similar manner, UI 400 may include similar search fields, to allow the user to select the replacement switch.

In FIG. 4B, assume that the user has selected both the replacement switch and the switch that it replaces. In such a case, UI 400 may present the user with a confirmation screen that indicates the replacement switch 414 and the switch 412 that it is to replace. On confirmation that the correct information has been entered, UI process 312 may signal network entity replacement engine 308 to validate that the topology information for switch 414 matches that of switch 412 and, in some cases, push a configuration to switch 414 based on the configuration of switch 412. For example, based on the inputs to UI 400, network entity replacement engine 308 may first validate that the replacement switch 414 is compatible and, if not, return an alert to UI 400. Alternatively, if the two switches 412-414 are compatible, network entity replacement engine may complete the replacement by pushing any necessary firmware, software, or parameters to replacement switch 414.

Referring again to FIG. 3, architecture 300 may also include a network topology configuration engine 310, in some embodiments. As noted above, the topology and state of the network can change over time and for a variety of different reasons. By maintaining a history of the network topology and entity configurations, network supervisory process 248 may also be able to revert one or more of the entities in the network to a previous topology and/or configuration from any prior point in time. More specifically, network topology configuration engine 310 may be configured to use the information in network topology database 304 and/or network entity configuration database 306, to roll the network back to a previous state, even outside of the replacement of a network entity.

By way of example, UI process 312 may receive a selection of a previous network topology and/or time frame from the UI provided by UI process 312. In turn, UI process 312 may provide the selections to network topology configuration engine 310 that uses this information to retrieve the corresponding topology information and configurations from databases 304-306. In turn, network topology configuration engine 310 may send control commands to the appropriate network entities in the network that cause the entities to revert to their previous configurations and topologies (e.g., by installing or uninstalling firmware or software, by adjusting the neighbor list of an entity, etc.).

Note that some of the network entities that existed at the time to which the network is to revert may differ from those presently in the network. For example, a particular switch may have been replaced in the network in the time since the point in time to which the network is to revert. In some embodiments, network topology configuration engine 310 may identify any deltas between the present state of the network and the desired state and provide an indication of these deltas for review via UI process 312. For example, the UI provided by UI process 312 may identify the entities that deviate from the historical view via different colored icons, to aid the administrator in recognizing the hardware delta between current day and historical, as well as giving the administrator the opportunity to decline the reversion. In some cases, a modified reversion can also be selected, such as by not modifying those entities that are presently in the network, but did not exist at the time the historical topology map was captured.

By way of example, consider the case of an industrial network that supports an automated factory. During the first three months of the year, the factory may manufacture mint toothpaste. Then, during the next three months, the factory may manufacture strawberry toothpaste. After those three months are completed, the factory may be transitioned back to manufacturing mint toothpaste. In such a case, the techniques herein can be used to "roll back" the industrial network to the earlier time in the year in which mint toothpaste was being manufactured.

Network supervisory process 248 may also include a network design engine 314, in some embodiments. In industrial environments, network topologies are designed and tuned to meet the needs of the industrial applications that traverse the network. This is true in fields such as manufacturing, utilities, city infrastructures, oil and gas, transportation, and the like. During execution, network design engine 314 may be configured to allow the user of UI process 312 to design a network layout, prior to deployment of the network. For example, the UI may allow the user to select which switches and other entities are to be deployed, their interconnections, and other design parameters.

According to various embodiments, network supervisory process 248 may further include a network design validator 316. Even if the user of UI process 312 specifies a flawless network design, there is still a potential for the network design to differ from the network that is actually deployed. For example, the network design may include details such as which port an Ethernet cable must be connected, as well as which features may be enabled on a given switch, access point, gateway, firewall, or for a specific port on a device. If the technician errs during the installation, this could impede the operation of the network or even cause the network to be unusable.

To validate the network installation against the network design, network design validator 316 may assess the parameters of the designed network stored by network design engine 314 in databases 304-306. As would be appreciated, the output of network design engine 314 may be uploaded to databases 304-306, either locally or remotely. In some embodiments, network design validator 316 may first assess whether the network design conforms to best practices, based on the type of topology of the designed network. During this process, network design validator 316 may provide a visual representation of the designed network, as well as any identified best practices or changes, to the user via UI process 316. If visually accurate, the user may apply the design for deployment and tracking purposes.

During deployment, each network entity may be initially lacking a running configuration. As each network entity is connected to the network and powered, the entity may obtain its IP address via DHCP and send a validation request to network supervisory process 248 via network data collector 304. Such a request may include an identifier for the entity, thereby allowing network design validator 316 to retrieve the designed configuration and other parameters for the entity from databases 304-306, and automatically apply any appropriate configuration to the entity (e.g., firmware, configuration parameters, etc.). Once applied to the network entity, network design validator 316 may compare the current configuration and topology information for the entity to the approved network design in databases 304-306. If the configuration and cabling applied to the network entity match the network design, then UI process 312 may notify the administrator of the successful deployment.

In the event that network design validator 316 determines that the deployed network entity differs in configuration or topology information from the network design, network design validator may send an alert to the administrator via UI process 316. For example, assume that the entity is a switch and that a port of the switch is not cabled to the correct peer port on another switch. In such a case, network design validator 316 may compare the topology information received from the entity (e.g., as determined by the entity using CDP or LLDP) to the topology information in network topology database 304, to identify the erroneous cabling. Similarly, network design validator 316 can identify when a switch is installed out of order (e.g., into a ring, linear, or star topology) from that of the network design. Any alert provided via UI process 312 regarding an incorrect deployment can then be acted on by the administrator.

In some cases, network design validator 316 may further recognize the order in which the network entities should be provisioned, starting with edge devices, and then provisioning inward to their neighboring entities, as the network builds from the edge(s) towards the last entity, to form the topology. The structured provisioning ensures that the network topology adheres to the validated network topology physically and in configuration. Once the deployment is completed, and matches the uploaded validated design exactly, network design validator 316 may determine that the validated design deployment process is complete and notifies the administrator via UI process 312 that the deployment has been successful and accurate.

Figure 5A:
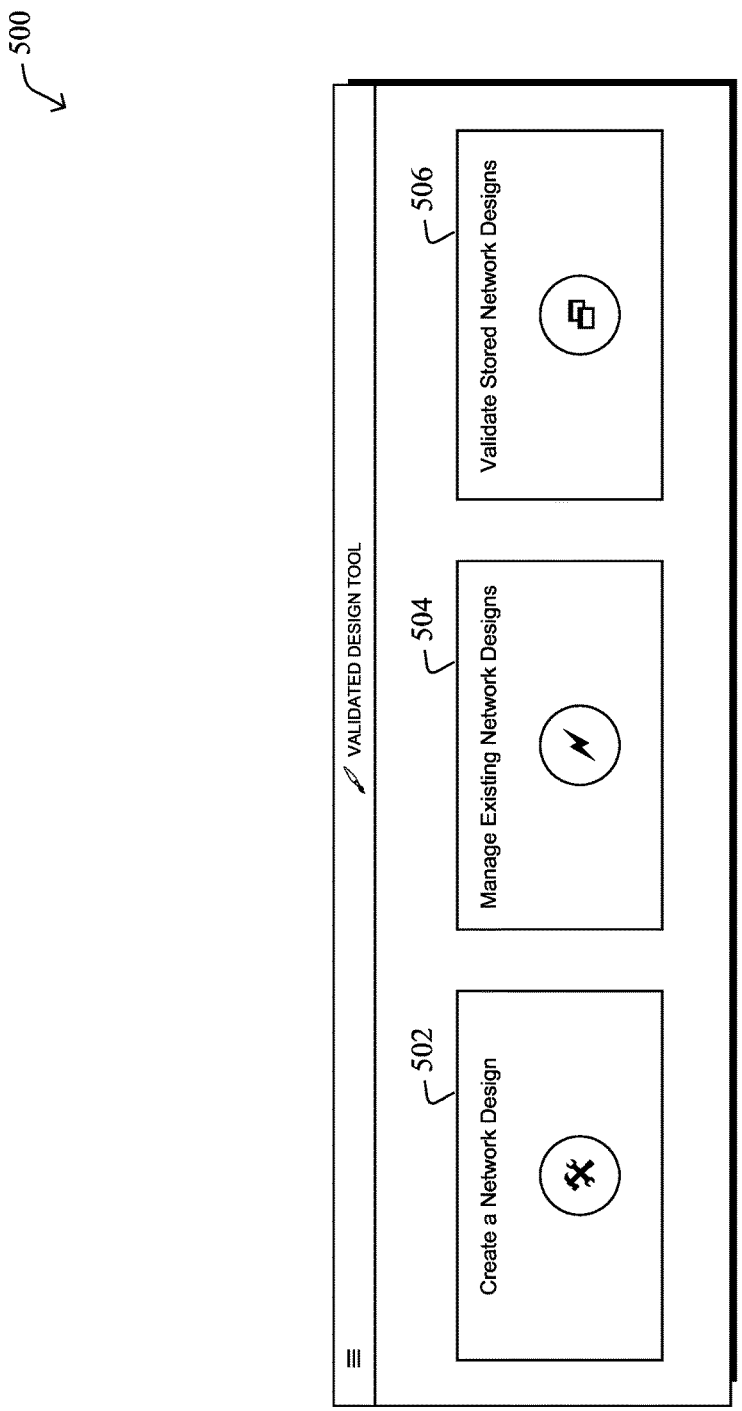
FIGS. 5A-5C illustrate an example user interface for validating a network design.
Figure 5B:
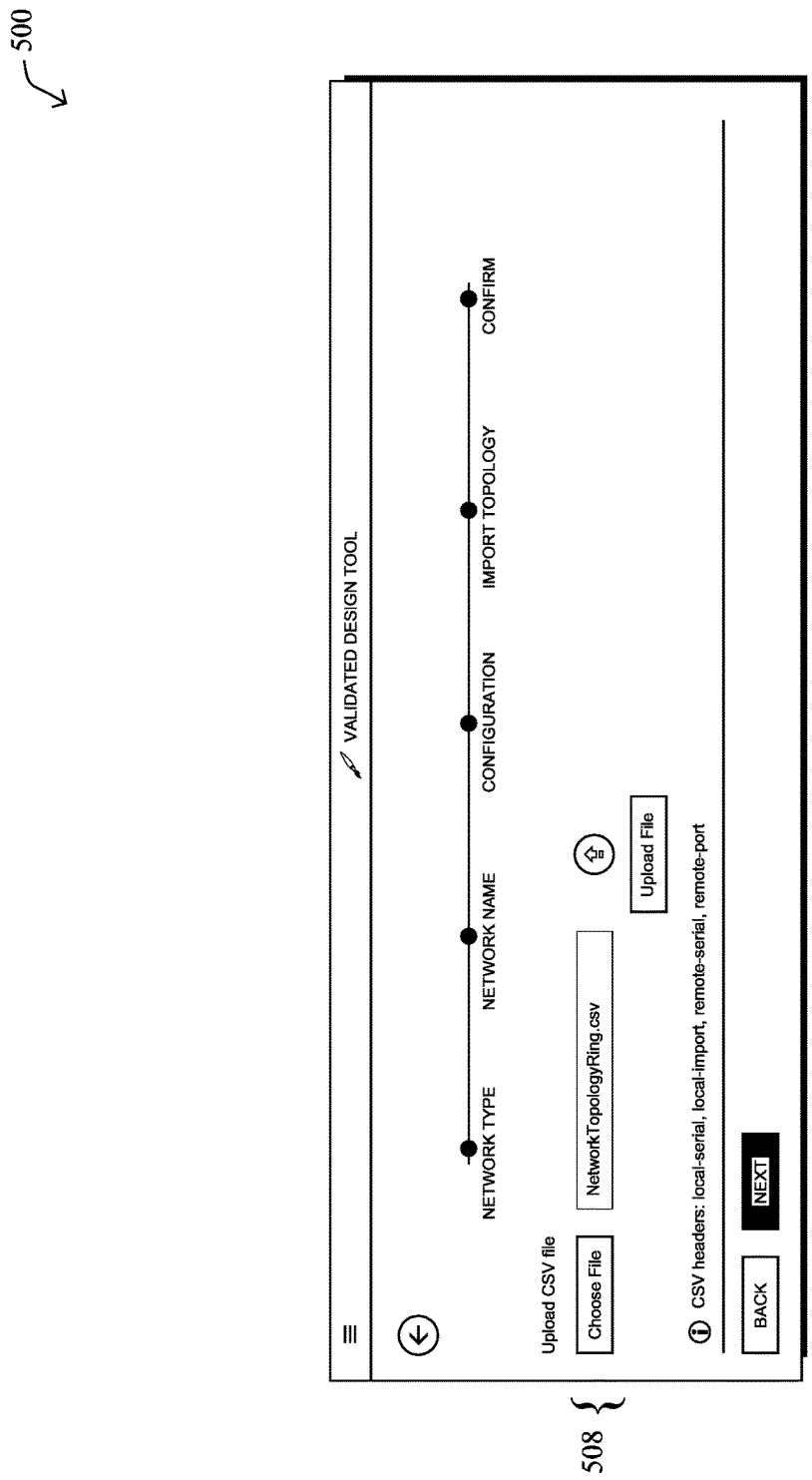
Figure 5C:
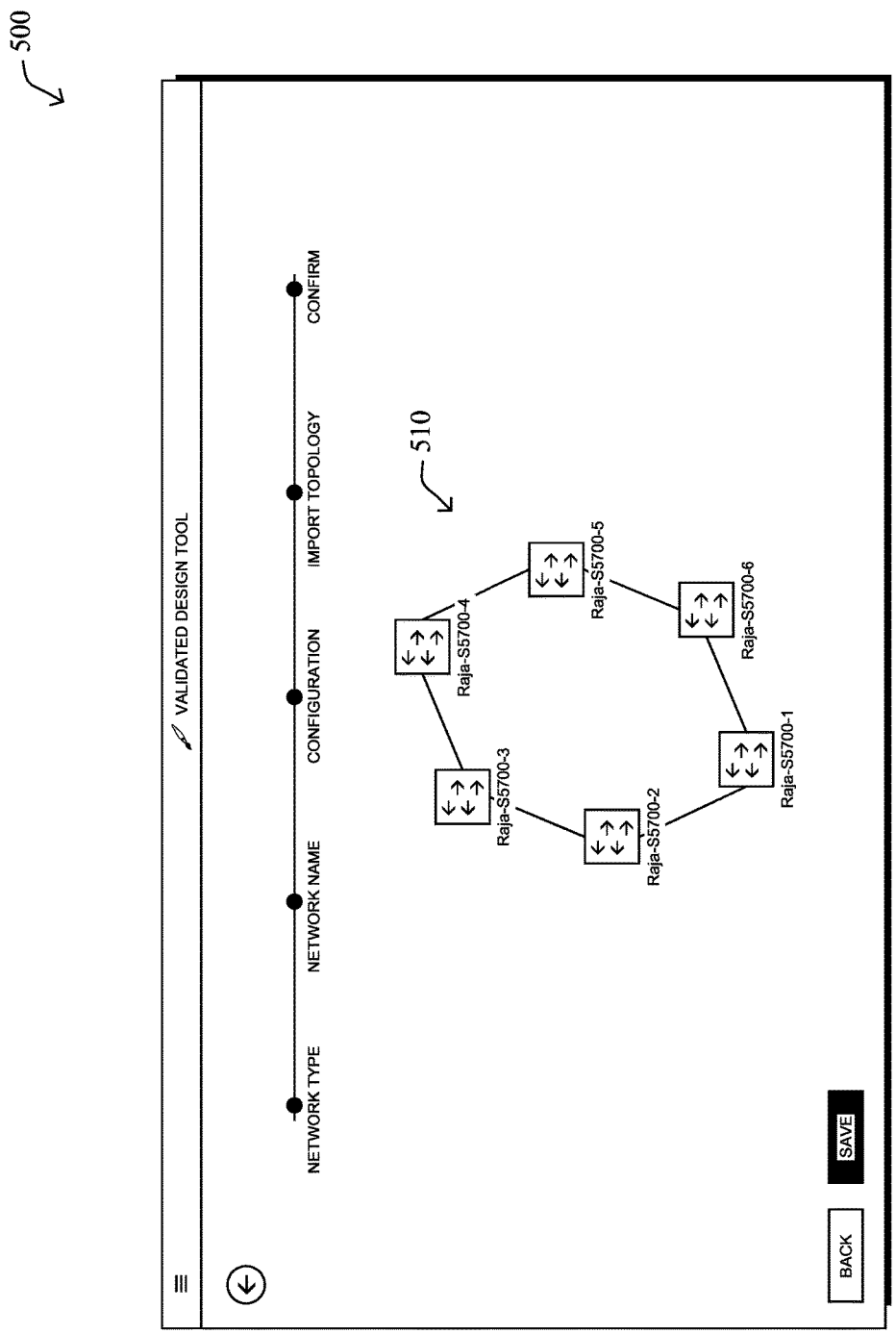

FIGS. 5A-5C illustrate an example UI for validating a network design, in some embodiments. As shown, UI process 312 may provide UI 500 to a display, for input by a user. In FIG. 5A, UI 500 may include selections 502-506 that allow the user to opt to create a new network design, manage existing network designs, or validate a stored network design, respectively. For example, selection 502 may allow the user to interface with network design engine 314, to create a new network design, and selection 504 may allow the user to modify an existing design. Similarly, selection 506 may allow the user to interface with network design validator 316, to validate a created design.

In FIG. 5B, assume that the user has opted for selection 506, to validate an existing design. In such a case, UI 500 may present the user with an input field 508, to select a network design to upload and validate. In other implementations, the design may already be stored in the system, allowing the user to select it via UI 500.

In FIG. 5C, after the user has uploaded the network design, UI 500 may provide a visualization 510 of the network design, for review by the user. If the user then confirms the design, the system may compare the network design to the actual network deployment, to identify any differences and notify the user of the differences.

Figure 6:
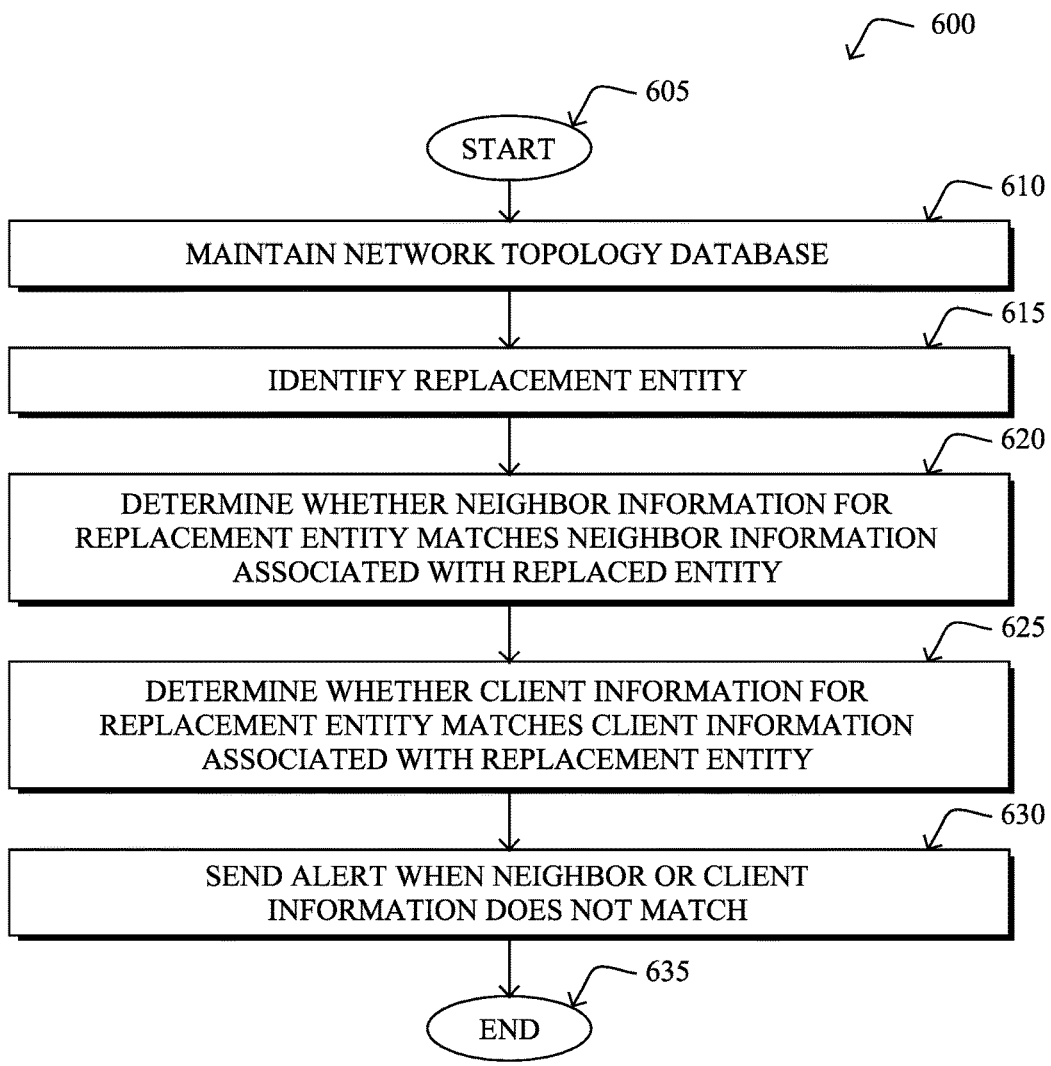
FIG. 6 illustrates an example simplified procedure for automated network entity replacement.

FIG. 6 illustrates an example simplified procedure for automated network entity replacement, in a network in accordance with one or more embodiments described herein. For example, a non-generic, specifically configured device (e.g., device 200) may perform procedure 600 by executing stored instructions (e.g., process 248). The procedure 600 may start at step 605, and continues to step 610, where, as described in greater detail above, the device may maintain a topology database of one or more topologies of entities in the network. In some embodiments, the device may receive topology information from the entities in the network. For example, a given entity may use a CDP or LLDP exchange to identify its neighbors and/or clients and report this topology information to the device. In turn, the device can use the reported topology information to populate the topology database maintained by the device.

At step 615, as detailed above, the device may identify a replacement entity that has physically replaced a particular one of the entities in the network. For example, the device may receive an indication of the replacement entity from a UI or, alternatively, from the replacement entity, directly.

At step 620, the device may determine whether neighbor information regarding one or more of the entities that neighbor the replacement entity matches neighbor information in the topology database associated with the replaced entity, as described in greater detail above. For example, the device may compare the port wirings, orderings, etc. of the replacement network entity to that of its predecessor.

At step 625, as detailed above, the device may determine whether client information regarding one of more clients of the replacement entity matches client information in the topology database associated with the replaced entity. Similar to the assessment of the neighboring network entities of the replacement entity, the device may also determine whether the clients of the replacement entity match that of the entity it replaced.

At step 630, the device may send an alert when the neighbor or client information of the replacement entity does not match the neighbor or client information in the topology database associated with the replaced entity, as described in greater detail above. For example, the device may send an alert to a UI, thereby notifying a user of the discrepancy (e.g., the mis-wired port of a switch, etc.). Procedure 600 then ends at step 635.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, establish a deeper level of topological validation, above and beyond the standard functions provided through a common Plug and Play (PnP) implementation. In particular, the techniques herein introduce extended topology and configuration awareness, prior to calculating which configuration is appropriate for delivery. In some network environments, such as government, military and industrial networks, such awareness is critical to preventing a rogue network device from being deployed. With such awareness, physical misconfigurations, such as an incorrect cable to port matching, can be averted, where the configuration may be port or edge client specific, maintaining the accuracy of the previous historical configuration to be implemented on the replacement network devices. In addition, if a network entity had been deployed with a specific collection of edge clients attached to it, the matching historical configuration can be re-deployed, based upon the identity of client devices. In addition, the system can revert the network to an even earlier configuration than that of the replaced entity, instead of the configuration that had been implemented previous to the switch replacement.

While there have been shown and described illustrative embodiments that provide for automated network entity replacement, it is to be understood that various other adaptations and modifications may be made within the spirit and scope of the embodiments herein. For example, while certain protocols are shown, such as CDP and LLDP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   maintaining, by a device in a network, a topology database of one or more topologies of entities in the network;
   identifying, by the device, a replacement entity that has physically replaced a particular one of the entities in the network;
   determining, by the device, whether neighbor information regarding one or more of the entities that neighbor the replacement entity matches neighbor information in the topology database associated with the replaced entity;
   determining, by the device, whether client information regarding one of more clients of the replacement entity matches client information in the topology database associated with the replaced entity; and
   sending, by the device, an alert when the neighbor or client information of the replacement entity does not match the neighbor or client information in the topology database associated with the replaced entity.

2. The method as in claim 1, further comprising:
   receiving, at the device and from the replacement entity, the neighbor information regarding the one or more of the entities that neighbor the replacement entity, wherein the replacement entity uses a Link Layer Discovery Protocol (LLDP) exchange to generate the neighbor information.

3. The method as in claim 1, wherein the entities are network switches.

4. The method as in claim 3, wherein determining whether the neighbor information regarding the one or more of the entities that neighbor the replacement entity matches the neighbor information in the topology database associated with the replaced entity comprises:
   determining, by the device, whether port information for the replacement entity matches port information for the replaced entity.

5. The method as in claim 3, wherein determining whether the neighbor information regarding the one or more of the entities that neighbor the replacement entity matches the neighbor information in the topology database associated with the replaced entity comprises:
   determining, by the device, whether port information for the replacement entity matches port information for a network entity that the replaced entity previously replaced.

6. The method as in claim 1, further comprising:
   maintaining, by the device, a configuration database of configurations of the network entities; and
   sending, by the device, a configuration to the replacement entity that is associated with the replaced entity in the configuration database.

7. The method as in claim 6, wherein sending the configuration to the replacement entity comprises:
   causing, by the device, firmware of the replacement entity to be downgraded.

8. The method as in claim 1, further comprising:
   receiving, at the device, a selection of one of the network topologies from the topology database; and
   sending, by the device, control commands to the entities in the network to implement the selected topology.

9. The method as in claim 1, further comprising:
   validating, by the device, a network design against the network, using the topology database.

10. An apparatus comprising:
    one or more network interfaces to communicate with a network;
    a processor coupled to the network interfaces and configured to execute one or more processes; and
    a memory configured to store a process executable by the processor, the process when executed configured to:
       maintain a topology database of one or more topologies of entities in the network;
       identify a replacement entity that has physically replaced a particular one of the entities in the network;
       determine whether neighbor information regarding one or more of the entities that neighbor the replacement entity matches neighbor information in the topology database associated with the replaced entity;
       determine whether client information regarding one of more clients of the replacement entity matches client information in the topology database associated with the replaced entity; and
       send an alert when the neighbor or client information of the replacement entity does not match the neighbor or client information in the topology database associated with the replaced entity.

11. The apparatus as in claim 10, wherein the process when executed is further configured to:
    receive, from the replacement entity, the neighbor information regarding the one or more of the entities that neighbor the replacement entity, wherein the replacement entity uses a Link Layer Discovery Protocol (LLDP) exchange to generate the neighbor information.

12. The apparatus as in claim 10, wherein the entities are network switches.

13. The apparatus as in claim 12, wherein the apparatus determines whether the neighbor information regarding the one or more of the entities that neighbor the replacement entity matches the neighbor information in the topology database associated with the replaced entity by:
    determining whether port information for the replacement entity matches port information for the replaced entity.

14. The apparatus as in claim 12, wherein the apparatus determines whether the neighbor information regarding the one or more of the entities that neighbor the replacement entity matches the neighbor information in the topology database associated with the replaced entity by:
    determining whether port information for the replacement entity matches port information for a network entity that the replaced entity previously replaced.

15. The apparatus as in claim 10, wherein the process when executed is further configured to:
    maintain a configuration database of configurations of the network entities; and
    send a configuration to the replacement entity that is associated with the replaced entity in the configuration database.

16. The apparatus as in claim 15, wherein the apparatus sends the configuration to the replacement entity by:
    causing firmware of the replacement entity to be downgraded.

17. The apparatus as in claim 10, wherein the process when executed is further configured to:
    receive a selection of one of the network topologies from the topology database; and send control commands to the entities in the network to implement the selected topology.

18. The apparatus as in claim 10, wherein the process when executed is further configured to:
    validate a network design against the network, using the topology database.

19. The apparatus as in claim 10, wherein the network is an industrial network.

20. A tangible, non-transitory, computer-readable medium storing program instructions that cause a device in a network to execute a process comprising:
    maintaining, by the device, a topology database of one or more topologies of entities in the network;
    identifying, by the device, a replacement entity that has physically replaced a particular one of the entities in the network;
    determining, by the device, whether neighbor information regarding one or more of the entities that neighbor the replacement entity matches neighbor information in the topology database associated with the replaced entity;
    determining, by the device, whether client information regarding one of more clients of the replacement entity matches client information in the topology database associated with the replaced entity; and
    sending, by the device, an alert when the neighbor or client information of the replacement entity does not match the neighbor or client information in the topology database associated with the replaced entity.

* * * * *